United States Patent
Tanaka

(10) Patent No.: US 8,521,231 B2
(45) Date of Patent: Aug. 27, 2013

(54) COMMUNICATION DEVICE AND DISPLAY SYSTEM

(75) Inventor: Kensaku Tanaka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/403,399

(22) Filed: Feb. 23, 2012

(65) Prior Publication Data

US 2012/0214553 A1  Aug. 23, 2012

(30) Foreign Application Priority Data

Feb. 23, 2011 (JP) ................................. 2011-037642

(51) Int. Cl.
*H04W 4/18* (2009.01)

(52) U.S. Cl.
USPC ........ 455/566; 455/518; 455/456.2; 370/352; 370/412

(58) Field of Classification Search
USPC ................. 455/458, 566, 518, 416, 574, 436, 455/422, 517, 515, 412.1; 370/342, 352, 370/412, 50.12; 359/690, 689, 557, 680, 359/692, 686, 715; 188/47, 107, 198; 714/712; 704/200.1, 201, 200
See application file for complete search history.

(56) References Cited

U.S. PATENT DOCUMENTS

| | | | | |
|---|---|---|---|---|
| 5,715,370 | A * | 2/1998 | Luther et al. | 704/270.1 |
| 7,406,414 | B2 * | 7/2008 | Creamer et al. | 704/235 |
| 7,593,387 | B2 * | 9/2009 | Leviton et al. | 370/352 |
| 7,822,050 | B2 * | 10/2010 | DeGrazia | 370/412 |
| 8,183,997 | B1 * | 5/2012 | Wong et al. | 340/539.11 |
| 2004/0102186 | A1 * | 5/2004 | Odinak | 455/416 |
| 2005/0021344 | A1 * | 1/2005 | Davis et al. | 704/277 |
| 2006/0069548 | A1 * | 3/2006 | Matsuura | 704/200.1 |
| 2006/0082662 | A1 * | 4/2006 | Isaacson | 348/231.99 |
| 2008/0130699 | A1 * | 6/2008 | Ma et al. | 372/50.12 |
| 2011/0195739 | A1 * | 8/2011 | Deleus et al. | 455/518 |

FOREIGN PATENT DOCUMENTS

JP  2000-32169 A  1/2000

* cited by examiner

*Primary Examiner* — Mahendra Patel
(74) *Attorney, Agent, or Firm* — Hoffmann & Baron LLP

(57) ABSTRACT

A communication device includes a microphone, communication unit, storage unit, extraction unit, and display control unit. The microphone converts the sound inputted into audio data, and then outputs the audio data. The communication unit receives audio data from an external communication device capable of communication. The storage unit stores registered word data corresponding to specific words. The extraction unit extracts, based on at least one among audio data outputted from the microphone and audio data received by the communication unit, and on the registered word data stored in the storage unit, specific words included in the sound based on the respective audio data. The display control unit causes the specific words extracted by the extraction unit, or phrases or sentences including the specific words, to be displayed on a display unit.

6 Claims, 4 Drawing Sheets

COMMUNICATION DEVICE AND DISPLAY SYSTEM

This application is based on and claims the benefit of priority from Japanese Patent Application No. 2011-037642, filed on 23 Feb. 2011, the content of which is incorporated herein by reference.

BACKGROUND OF THE INVENTION

1. Field of the Invention

The present invention relates to a communication device that performs a telephone call with an external communication device, and a display system including this communication device.

2. Related Art

Among communication devices such as cellular telephone devices, there are those that, upon carrying out a call with an external communication device, can record the contents of this call (conversation) (refer to Japanese Unexamined Patent Application, Publication No. 2000-32169). With such a communication device, the contents of a conversation can be confirmed by replaying the recorded conversation after the call has been ended.

SUMMARY OF THE INVENTION

However, with the communication device disclosed in Japanese Unexamined Patent Application Publication No. 2000-32169, in order to understand the call contents, it is necessary to listen to the recorded audio from the beginning. In particular, with this communication device, even in a case of wanting to understand a short part of the call contents of a long telephone call, it may be necessary to listen to the recorded audio from beginning to end. Therefore, it may be difficult to understand the call contents in a short time with the communication device disclosed in Japanese Unexamined Patent Application Publication No. 2000-32169.

The present invention has an object of providing a communication device for which understanding call contents is simple, and a display system.

A communication device according to the present invention includes: a display unit; a microphone to which sound is inputted, and the converts the sound thus inputted into a first audio data and outputs the audio data; a communication unit that receives a second audio data from an external communication device capable of communication; a storage unit that stores registered word data corresponding to a specific word; an extraction unit that extracts, based on at least one among the first audio data outputted from the microphone and the second audio data received by the communication unit, and on the registered word data stored in the storage unit, a specific word included in the sound based on respective audio data; and a display control unit that causes a specific word extracted by the extraction unit, or a phrase or sentence including the specific word, to be displayed on the display unit.

In addition, it is preferable for the extraction unit to store, in the storage unit, extraction data corresponding to a specific word extracted or a phrase or sentence including the specific word, and the display control unit to cause the specific word or a phrase or sentence including the specific word based on the extraction data stored in the storage unit to be displayed on the display unit, in a case of the second audio data not being inputted to the communication unit for a predetermined time and the first audio data not being outputted from the microphone for the predetermined time, or in a case of a call with an external communication device having ended.

Furthermore, it is preferable for the storage unit to store schedule book data corresponding to a schedule book, and the communication device to further include a schedule registration unit that overwrites the schedule book data stored in the storage unit in order to register a specific word extracted by the extraction unit in the schedule book.

Additionally, it is preferable for the communication device to further include a timing unit that measures time, in which the registered word data stored in the storage unit includes first registered word data, and second registered word data in which a greater amount of specific words is registered than an amount of specific words registered in the first registered word data, and the extraction unit extracts, based on the first registered word data, a specific word included in sound based on the first or second audio data in a case of the time measured by the timing unit being morning, and extracts, based on the second registered word data, a specific word included in sound based on the first or second audio data in a case of the time measured by the timing unit being afternoon.

Moreover, it is preferable for the communication device to further include a transmission unit that can cause a specific word extracted by the extraction unit, or a phrase or sentence including the specific word, to be displayed on the display unit when the time measured by the timing unit reaches the morning of a following day, in a case of the specific word included in sound based on the first or second audio data having been extracted based on the second registered word data.

In addition, according to the present invention, in display system equipped with a communication device and external equipment that connects with the communication device to be able to communicate via a communication network, the communication device includes: a display unit that performs image display based on display data; a microphone to which sound is inputted, and that converts the sound inputted into a first audio data and outputs the audio data; a first communication unit that receives a second audio data from an external communication device capable of communication; and a second communication unit that transmits the first audio data outputted from the microphone and the second audio data received by the first communication unit to the external equipment, as well as receives display data from the external equipment; and the external equipment includes: a third communication unit that receives respective audio data from the communication device, as well as transmits display data to the communication device; a storage unit that stores registered word data corresponding to a specific word; an extraction unit that extracts, based on the respective audio data received by the third communication unit and the registered word data stored in the storage unit, a specific word included in sound based on the respective audio data; and a generation unit that generates the display data in order to cause the specific word extracted by the extraction unit, or a phrase or sentence including the specific word to be displayed on the display unit of the communication device.

The present invention facilitates the understanding of call contents.

DETAILED DESCRIPTION OF THE INVENTION

Embodiments of the present invention will be explained hereinafter.

Figure 1:
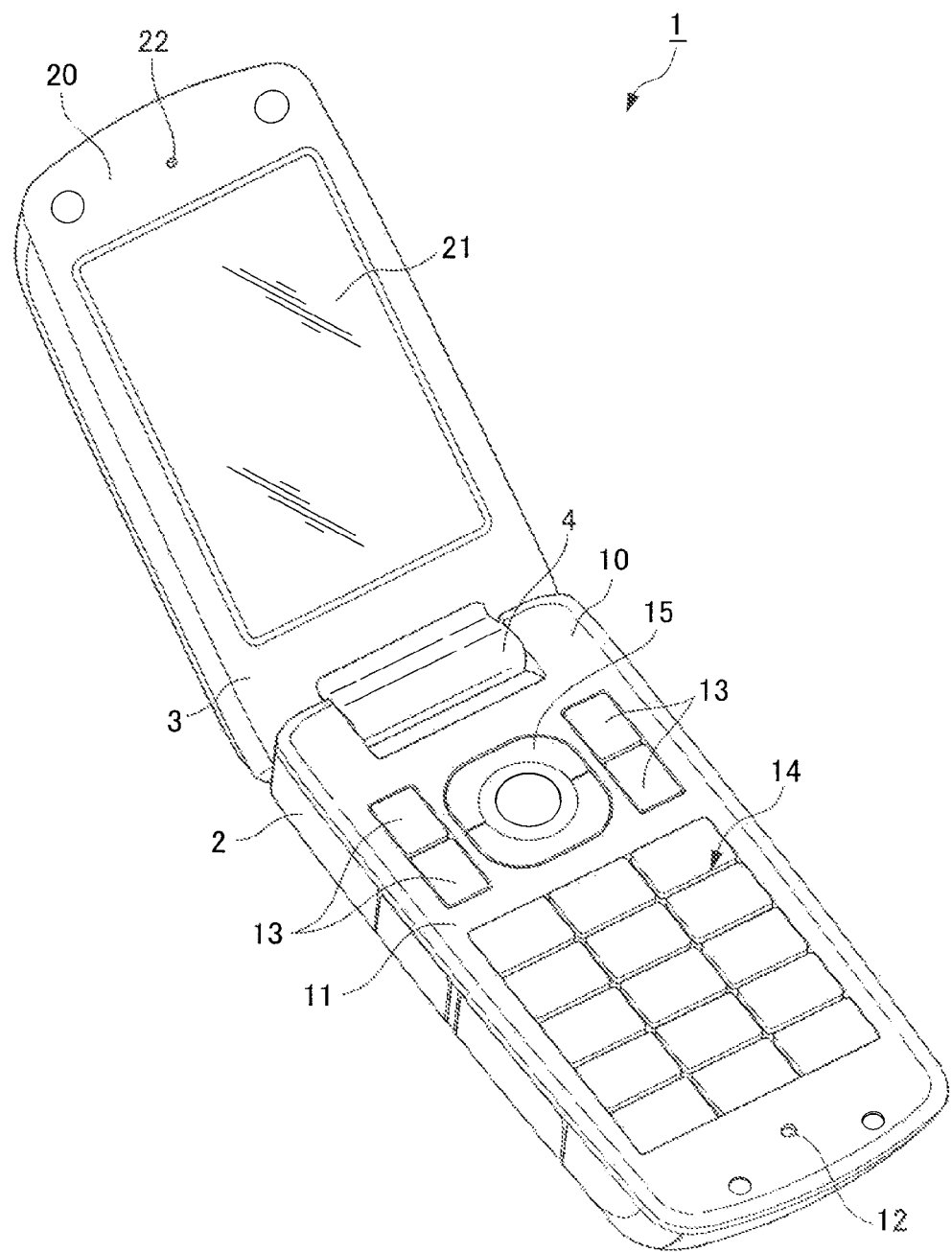
FIG. 1 is an external perspective view of a cellular telephone device according to an embodiment of a communication device of the present invention.

First, a cellular telephone device 1 according to an embodiment of a communication device of the present invention will be explained. FIG. 1 is an external perspective view of the cellular telephone device 1 according to the embodiment of a communication device of the present invention. It should be noted that, although FIG. 1 shows the form of a so-called folding-type cellular telephone device, the form of the cellular telephone device according to the present invention is not limited thereto. For example, the cellular telephone device may be a slider type in which one of the bodies slides in one direction from a state in which both bodies are superimposed, a rotating type (turn-type) configured so as to allow one body to rotate around an axis line along the superimposing direction, and a type in which the operation unit and display unit are disposed in one body without having a connecting portion (straight-type or flip-type).

The cellular telephone device 1 includes an operation-unit side body 2 and a display-unit side body 3. The operation-unit side body 2 includes, on a front face portion 10 thereof, an operation unit 11, and a microphone 12 into which sound produced by a user of the cellular telephone device 1 is input during a call. The operation unit 11 is configured from function setting operation keys 13 for operating various functions such as various settings, a telephone directory function, and a mail function; input operation keys 14 for inputting the digits of a telephone number and characters for mail, etc.; and a selection operation key 15 for performing selection of various operations, scrolling, etc. It should be noted that these keys may be configured so as to be arranged (displayed) on a touch panel formed integrally with the display unit 21.

In addition, the display-unit side body 3 includes, on a front face portion 20 thereof, the display unit 21 that displays a variety of information, and a speaker 22 that outputs sound of the other party of the call (user of an external communication device).

Furthermore, an upper end portion of the operation-side body 2 and a lower end portion of the display-unit side body 3 are connected via a hinge mechanism 4. Moreover, the cellular telephone device 1 can be set in a state where the operation-unit side body 2 and the display-unit side body 3 are apart from each other (opened state), and in a state where the operation-unit side body 2 and the display-unit side body 3 are folded (folded state), by relatively rotating the operation-unit side body 2 and the display-unit side body 3 connected via the hinge mechanism 4.

The cellular telephone device 2 configured in this way has a function of facilitating the understanding of call contents.

Figure 2:
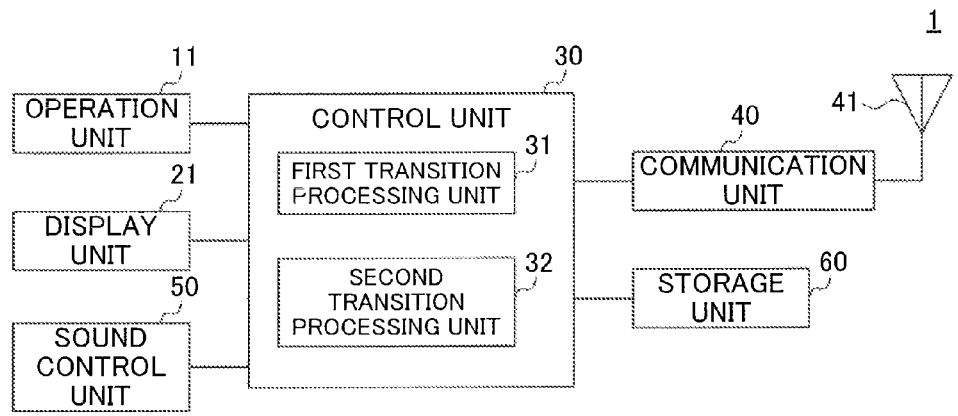
FIG. 2 is a functional block diagram showing the configuration for the cellular telephone device to realize the above-mentioned function.

The configuration and operations for realizing the above-mentioned function according to the cellular telephone device 1 will be explained in detail hereinafter. First, the configuration for realizing the above-mentioned function of the cellular telephone device 1 according to the present embodiment will be explained while referring to FIG. 2. FIG. 2 is a functional block diagram showing the configuration for the cellular telephone device 1 to realize the above-mentioned function.

In addition to the aforementioned display unit 21 and aforementioned microphone 12, the cellular telephone device 1 includes an analog/digital (A/D) converter 31, communication unit 32, storage unit 33 and control unit 40.

Herein, the microphone 12 converts the inputted sound into audio data, and then outputs the audio data.

The A/D converter 31 converts the analog audio data output from the microphone 12 into digital audio data, and supplies this to the control unit 40.

The communication unit 32 is used in a telephone call with an external communication device (as one example, a cellular telephone device), and the audio data from this external communication device is input thereto. For example, the communication unit 32 includes an antenna (not illustrated) and an RF circuit (not illustrated). The antenna carries out communication with a base station or the like at a predetermined frequency band (as one example, 800 MHz). The RF circuit carries out demodulation processing on signals received by the antenna, and supplies the processed signal to the control unit 40. The processed signal (audio signal on which demodulation processing has been performed) is supplied to the control unit 40 as a digital signal. In addition, the RF circuit carries out modulation processing on signals supplied from the control unit 40, and transmits these to the base station or the like through analog.

The storage unit 33 stores registered word data corresponding to one or a plurality of specific words. Specific word indicates a word that is desired to be extracted from among the call contents. For example, the specific word is a person's name, place name, time, or numeric character. Such a specific word may be registered in advance, or additionally registered by a user. In addition, the specific word may be a word that appears at least a predetermined number of times during a conversation between the user of the cellular telephone device 1 and the user of the external communication device. Furthermore, the specific word may be a word repeated (recited) by the user of the cellular telephone device 1 and the user of the external communication device. The storage unit 33 is configured from semiconductor memory, for example. The storage unit 33 may also serve as external memory that is removable.

The control unit 40 includes an extraction unit 41 and display control unit 42.

Based on at least one of audio data outputted from the microphone 12 and audio data inputted to the communication unit 32, and on the registered word data stored in the storage unit 33, the extraction unit 41 extracts specific words included in the sound based on the respective audio data. As a specific example, the extraction unit 41 performs speech analysis on the sound based on the audio data. Furthermore, the extraction unit 41 determines whether or not the specific word is included in the sound, based on a comparison between the data after speech analysis, and the registered word data read from the storage unit 33. Then, the extraction unit 41 extracts this specific word in the case of having determined that the specific word is included in the sound.

The method of extracting the specific word by way of the extraction unit 41 is not limited to the above-mentioned example. For example, the extraction unit 41 may extract the specific word from the sound based on audio data by way of performing morphological analysis on the audio data.

The display control unit 42 causes the specific word extracted by the extraction unit 41 to be displayed on the display unit 21.

In a case of there being a plurality of specific words to be displayed on the display unit 21, the display control unit 42 enables specific words to be displayed on the display unit 21 by making it possible to cause the display contents to scroll. In addition, in a case of there being a plurality of specific words to be displayed on the display unit 21, the display control unit 42 also enables only the specific word selected based on an operation of the user to be displayed on the display unit 21. Furthermore, in a case of there being a plurality of specific words to be displayed on the display unit 21, the display control unit 42 also enables displaying on the display unit 21 by listing in order from the specific word extracted the greatest number of times among the specific words extracted from the call contents.

In addition, in a case of there being a plurality of specific words to be displayed on the display unit 21, the display control unit 42 also enables specific words corresponding to "when", "where", and "who" to be displayed on the display unit 21 by arranging at a higher order than other specific words. In this case, a specific word corresponding to "when" is extracted as a specific word corresponding to a time. In addition, a specific word corresponding to "where" is extracted as a specific word corresponding to a place name. Furthermore, a specific word corresponding to "who" is extracted as a specific word corresponding to a person's name.

Since the cellular telephone device 1 displays the specific words extracted from the call contents on the display unit 21 in this way, it is possible to understand the call contents in a simple manner such as confirming the display of the display unit 21. In particular, since the cellular telephone device 1 extracts proper nouns such as people's names and place names, times, words that repeatedly occur in a conversation, etc. as the specific words, it is possible to understand when, where, who, and what to do, by simply confirming the display of the display unit 21.

In addition, the extraction unit 41 preferably stores extraction data corresponding to the extracted specific words in the storage unit 33. In this case, the display control unit 42 causes the specific word to be displayed on the display unit 21 based on the extraction data stored in the storage unit 33, in a case of audio data during a predetermined time not being inputted to the communication unit 32 and the audio data during the predetermined time not being outputted from the microphone 12, or in a case of the call with the external communication device having ended.

The case of audio data during a predetermined time not being inputted to the communication unit 32 and the audio data during the predetermined time not being outputted from the microphone 12 is the matter of a case in which a conversation is interrupted despite being in a call state. In addition, the case of the call with the external communication device having ended is the matter of a case of the on-hook key configuring the operation unit 11 being operated by the user.

The cellular telephone device 1 can thereby allow the call contents to be confirmed by the user.

Moreover, the storage unit 33 preferably stores schedule book data corresponding to a schedule book. In this case, in order to record the specific words extracted by the extraction unit 41 in the schedule book, the cellular telephone device 1 further includes a schedule registration unit 43 that overwrites the schedule book data stored in the storage unit 33.

For example, "requirements", "times", "places", "names", etc. are registered in the schedule book.

The schedule registration unit 43 overwrites the schedule book data stored in the storage unit 33, in order to register, among the specific words extracted by the extraction unit 41, a specific word corresponding to a "time", a specific word corresponding to a "place", and a specific word corresponding to a "name", for example, into the time entry and place entry of the schedule book.

The cellular telephone device 1 can thereby register call contents into a schedule book, in addition to displaying the call contents on the display unit 21.

In this regard, there are research findings regarding there being a daily fluctuation in the memory of elderly people. In other words, these research finding are that, although the memory of elderly people is not so inferior in the case of the time being morning, the memory of elderly people when the time of day is in the afternoon worsens relative to the morning. As a result, in the case of the time being afternoon, the cellular telephone device 1 preferably increases the types of specific words displayed on the display unit 21, by increasing the types of specific words extracted by the extraction unit 41, thereby facilitating recollection of the call contents.

In order to realize such a cellular telephone device 1, the cellular telephone device 1 further includes a timing unit that measures time. The timing unit 34 is a real-time clock or the like.

In addition, the registered word data stored in the storage unit 33 includes first registered word data, and second registered word data in which more specific words are registered than the amount of specific words registered in the first registered word data. As a result, the extraction unit 41 is able to extract a greater amount of types of specific words in a case of referencing the second registered word data than in a case of referencing the first registered word data.

In addition, in the case of the time measured by the timing unit 34 being morning, the extraction unit 41 extracts, based on the first registered word data, specific words included in the sound based on the audio data. Furthermore, in the case of the time measured by the timing unit 34 being afternoon, the extraction unit 41 extracts, based on the second registered word data, specific words included in the sound based on the audio data. In other words, upon initiating the extraction of specific words in the sound based on the audio data, the extraction unit 41 selects between referencing the data of either the first registered word data or the second registered word data stored in the storage unit 33, based on the time measured by the timing unit 34. Then, the extraction unit 41 extracts, based on the selected data, specific words based on the audio data.

Therefore, since it is possible to extract a greater amount of types of specific words in a case of the time being afternoon compared to a case of the time being morning, the cellular telephone device 1 can facilitate recollection of call contents by increasing the types of specific words displayed on the display unit 21.

In addition, the cellular telephone device 1 further includes a transmission unit 44 capable of making the specific words extracted by the extraction unit 41 be displayed on the display unit 21 when the time measured by the timing unit 34 reaches the morning of the next day, in a case of specific words included in the sound based on the audio data having been extracted by the extraction unit 41 based on the second registered word data. In other words, in a case of a specific word being extracted by the extraction unit 41 when the time is afternoon, the transmission unit 44 is configured so as to paste the specific word in the text of an outgoing mail or attach the specific word to the outgoing mail, so that the outgoing mail is delivered to the device itself, transmitting the outgoing mail through the communication unit 32.

As a specific example, in a case of a specific word being extracted by the extraction unit 41 when the time is afternoon, the transmission unit 44 prepares an outgoing mail. In this case, the transmission unit 44 performs first processing to paste the specific word extracted by the extraction unit 41 to the text of the outgoing mail, or second processing to attach data corresponding to the specific word extracted by the extraction unit 41 to the outgoing mail as an attached file. It should be noted that whether the first processing is performed or the second processing is performed is set as appropriate by the user.

In addition, the transmission unit 44 sets the mail address in order for this outgoing mail to be delivered to the device itself as the destination of the outgoing mail. It should be noted that this mail address is stored in advance in the storage unit 33. When generation of the outgoing mail is completed, the transmission unit 44 stores the outgoing mail thus generated in an outgoing mailbox (storage unit 33).

Furthermore, the transmission unit 44 causes the outgoing mail stored in the outgoing mailbox to be transmitted via the communication unit 32, in a case of the time measured by the timing unit 34 reaching a day following the day on which the specific words were extracted (next day) at 7 o'clock, for example. The mail thus transmitted is delivered to the cellular telephone device 1 since the mail address of the device itself is set.

It should be noted that the transmission unit 44 can attach the specific words registered in the schedule book (schedule) to the mail in a case of the specific words being registered in the schedule book by the schedule registration unit 43.

In this way, in a case of the user of the cellular telephone device 1 being an elderly person, since this user will confirm the mail in the morning when their memory has not declined to some extent; therefore, remembering the call contents of the previous day is facilitated.

It should be noted that the transmission unit 44 can also pose as if the mail were transmitted from outside by way of internal processing, instead of actually transmitting the mail to the destination of the device itself. In other words, the transmission unit 44 can simulate such that the mail in which the specific words are included were received by the cellular telephone device 1.

It should be noted that the cellular telephone device 1 can also be set so that all mails are delivered in the morning.

In addition, the cellular telephone device 1 can also be set so that, in a case of mail being received when the time measured by the timing unit 34 is afternoon, this received mail is received again in the morning of the next day.

Furthermore, in a case of performing a call when the time measured by the timing unit 34 is afternoon, the cellular telephone device 1 can also store the contents of this call in the storage unit 33. In this case, the cellular telephone device 1 will receive a call on the next day and replay the call contents stored in the storage unit 33.

In addition, the cellular telephone device 1 can store, in the storage unit 33, an event that occurred when the time measured by the timing unit 34 was afternoon, and cause the event stored in the storage unit 33 to be displayed on the display unit 21 in the morning of the next day.

Next, operations of the cellular telephone device 1 will be explained.

Figure 3:
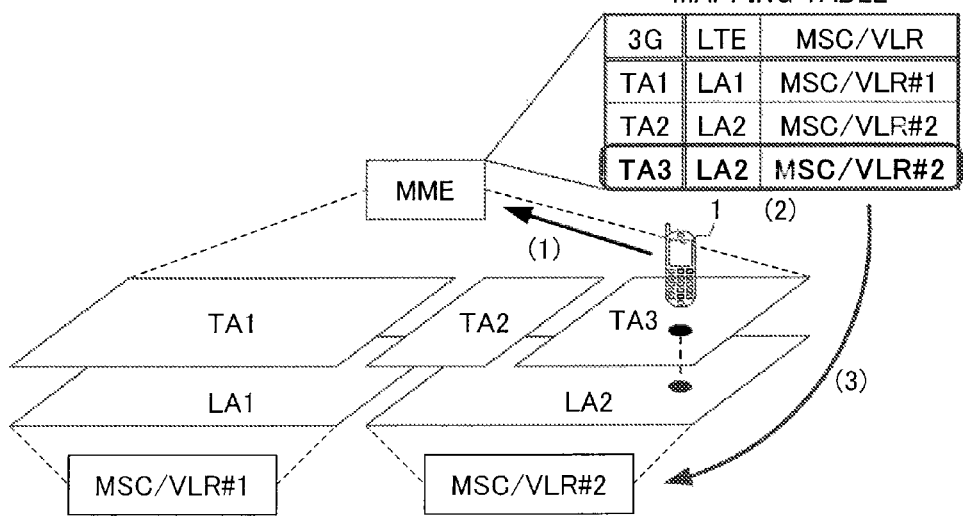
FIG. 3 is a flowchart illustrating a first operation of the cellular telephone device.

First, a first operation of the cellular telephone device 1 will be explained. FIG. 3 is a flowchart illustrating the first operation of the cellular telephone device 1.

In Step S101, the communication unit 32 initiates a call with an external communication device by performing predetermined call processing.

In Step S102, the extraction unit 41 initiates the extraction of specific words in the sound based on audio data, by performing speech analysis on the audio data.

In Step S103, the extraction unit 41 determines whether or not specific words are included in the sound based on the audio data. In the case of specific words being included in the sound (YES), the processing advances to Step S104. In the case of specific words not being included in the sound (NO), the processing advances to Step S105.

In Step S104, the extraction unit 41 extracts a specific word included in the sound, and stores this specific word in the storage unit 33.

In Step S105, the communication unit 32 determines whether predetermined call termination processing has been performed. In the case of the call termination processing not having been performed (NO), the processing returns to Step S103. In the case of the call termination processing having been performed (YES), the communication unit 32 ends the call with the external communication device. The extraction unit 41 thereby ends processing to extract specific words from the sound. Furthermore, in the case of the call termination processing having been performed (YES), the processing advances to Step S106.

In Step S106, the display control unit 42 reads the specific words stored in the storage unit 33 in the processing of Step S104, and causes the specific words to be displayed on the display unit 21.

The cellular telephone device 1 thereby displays the specific words extracted from the call contents on the display unit 21; therefore, it is possible to understand the call contents in a simple manner such as confirming the display of the display unit 21.

Figure 4:
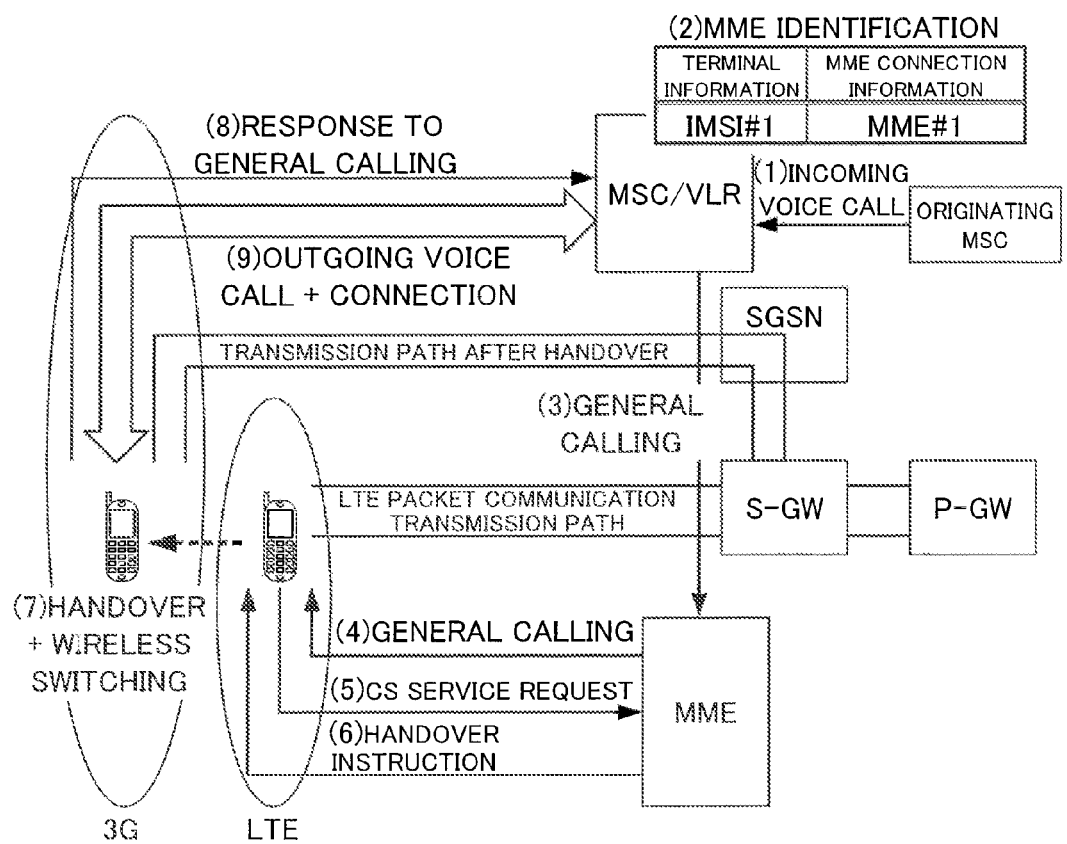
FIG. 4 is a flowchart illustrating a second operation of the cellular telephone device.

First, the second operation of the cellular telephone device 1 will be explained. FIG. 4 is a flowchart illustrating the second operation of the cellular telephone device 1.

In Step S201, the communication unit 32 initiates a call with an external communication device by performing predetermined call processing.

In Step S202, the extraction unit 41 initiates the extraction of specific words from the sound based on audio data, by performing speech analysis on the audio data.

In Step S203, the extraction unit 41 judges if the time measured by the timing unit 34 is morning, or the time is afternoon.

In Step S204, the extraction unit 41 determines whether specific words are included in the sound based on audio data. In this case, if the time judged in the processing of Step S203 is morning, the extraction unit 41 determines, based on the first registered word data, whether specific words are included in the sound based on audio data. On the other hand, if the time judged in the processing of Step S203 is afternoon, the extraction unit 41 determines, based on the second registered word data, whether specific words are included in the sound based on audio data. In the case of specific words being included in the sound (YES), the processing advances to Step S205. In the case of specific words not being contained in the sound (NO), the processing advances to Step S206.

In Step S205, the extraction unit 41 extracts a specific word included in the sound, and stores this specific word in the storage unit 33.

In Step S206, the communication unit 32 determines whether predetermined call termination processing has been performed. In the case of the call termination processing not having been performed (NO), the processing returns to Step S204. In the case of the call termination processing having been performed (YES), the communication unit 32 ends the call with the external communication device. The extraction unit 41 thereby ends the processing to extract specific words from the sound. Furthermore, in the case of the call termination processing having been performed (YES), the processing advances to Step S207.

In Step S207, the display control unit 42 reads the specific words stored in the storage unit 33 in the processing of Step S104, and causes the specific words to be displayed on the display unit 21.

In Step S208, the schedule registration unit 43 reads the word stored in the storage unit 33 in the processing of Step S205, and overwrites the schedule book data, thereby registering this specific word in the schedule book.

In Step S209, the transmission unit 44 transmits a mail to which the schedule registered in the schedule book in the processing of Step S208 (specific words) is attached to the device itself, in the morning of the day following the day (next day) on which the specific words were extracted (as one example, at 7 o'clock).

In this way, in the case of the time being afternoon, the cellular telephone device 1 enables the extraction of a greater amount of types of specific words compared to the case of the time being morning; therefore, it is possible to facilitate recollection of call contents by increasing the types of specific words displayed on the display unit 21. In addition, the cellular telephone device 1 can register call contents in the schedule book, in addition to displaying call contents on the display unit 21. Furthermore, in the case of the user of the cellular telephone device 1 being an elderly person, since this user will confirm the mail in the morning when their memory has not deteriorated to some extent, the likelihood of remembering the call contents of the previous day increases.

Figure 5:
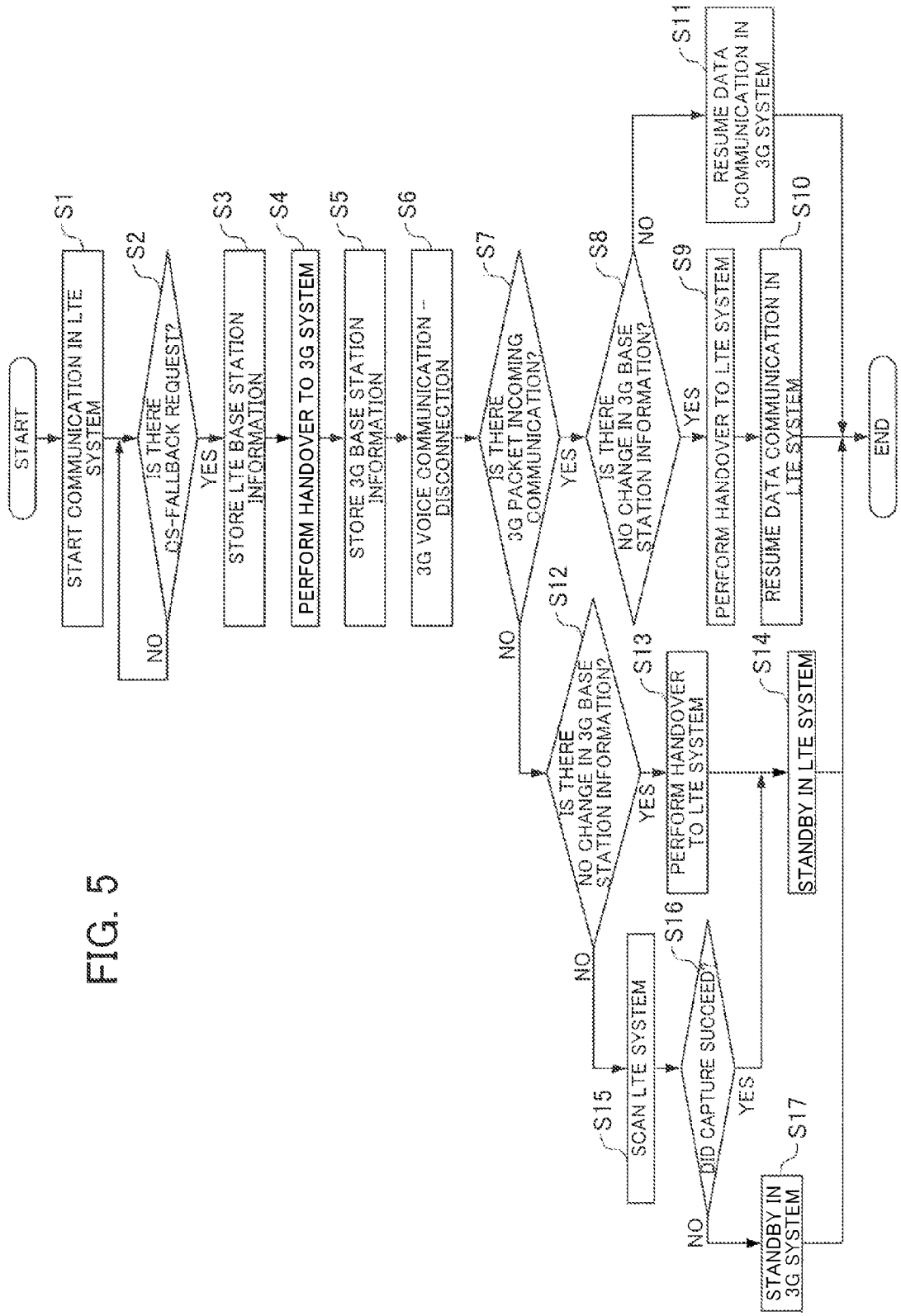
FIG. 5 is a block diagram of a display system according to an embodiment of the present invention.

Next, an embodiment of a display system 100 of the present invention will be explained. FIG. 5 is a block diagram of a display system 100 according to an embodiment of the present invention.

The display system 100 includes a cellular telephone device 110 as a communication device, and external equipment 130 connecting with the cellular telephone device 110 to enable communication via a communication network N.

The cellular telephone device 110 includes a microphone 111, A/D converter 112, first communication unit 113, display unit 114, second communication unit 115, and control unit 116.

The display unit 114 performs image display based on display data.

The microphone 111 is inputted sound, and converts the sound thus inputted into audio data, and then outputs the audio data.

The A/D converter 112 converts the analog audio data outputted from the microphone 111 into digital audio data, and supplies this to the control unit 140.

The first communication unit 113 is used in a telephone call with an external communication device (as one example, a cellular telephone device), and the audio data from this external communication device is inputted thereto. For example, the first communication unit 113 includes the aforementioned antenna (not illustrated) and the aforementioned RF circuit (not illustrated).

The second communication unit 115 transmits audio data outputted from the microphone 111 and audio data inputted to the first communication unit 113 to the external equipment 130, as well as receiving display data from the external device 130. When performing a call by way of the first communication unit 113, or in a case of the call performed by the first communication unit 113 being employed has ended, the second communication unit 115 can transmit the respective audio data to the external equipment 130, and further, can receive display data from the external equipment 130.

The control unit 116 controls the first communication unit 113, display unit 114, second communication unit 115, etc.

The external equipment 130 includes a third communication unit 131, storage unit 132, and control unit 140.

The third communication unit 131 receives the respective audio data from the cellular telephone device 110, as well as transmitting display data to the cellular telephone device 110.

The storage unit 132 stores registered word data corresponding to specific words. Specific word indicates a word that is desired to be extracted from among the call contents.

In addition, the control unit 140 includes an extraction unit 141 and generation unit 142.

The extraction unit 141 extracts, based on the respective audio data received by the third communication unit 131 and the registered word data stored in the storage unit 132, specific words included in the sound based on the respective audio data. As a specific example, the extraction unit 141 performs speech analysis on the sound based on audio data. Furthermore, the extraction unit 141 determines whether specific words are included in the sound, based on a comparison between speech analyzed data and registered word data read from the storage unit 132. Then, in a case of determining that a specific word is included in the sound, the extraction unit 141 extracts this specific word.

The generation unit 142 generates display data in order to cause the specific word extracted by the extraction unit 141 to be displayed on the display unit 114 of the cellular telephone device 110.

Since the specific words are displayed on the display unit 114 of the cellular telephone device 110 based on the display data, the display system 100 can allow the call contents to be confirmed by the user in this way.

It should be noted that the cellular telephone devices 1 and 110 are given in the aforementioned embodiments as examples of the communication device. However, the communication device is not to be limited to the cellular telephone devices 1 and 110, and may be a stationary telephone or PHS (Personal Handyphone System), for example.

It should be noted that, although a case of the specific words being displayed has been explained in the aforementioned examples, what is displayed may be a phrase containing specific words or a statement containing specific words. In this case, it can be realized by finding a phrase or break in a sentence using morphological analysis. Alternatively, the phrase or break in a sentence may be found according to the speakers of the conversation changing or the timing at which a conversation pauses.

What is claimed is:

1. A communication device in communication with an external communication device comprising:
   a display unit;
   a microphone to which sound is inputted, the microphone converting the sound into first audio data, the microphone outputting the first audio data;
   a communication unit that receives second audio data from the external communication device;
   a storage unit that stores registered word data corresponding to a specific word;
   an extraction unit that extracts the specific word from the first audio data outputted from the microphone based on the registered word data stored in the storage unit;
   a display control unit that causes at least one of the specific word extracted by the extraction unit, a phrase including the specific word, or a sentence including the specific word to be displayed on the display unit of the communication device; and a timing unit that measures time, wherein the registered word data stored in the storage unit includes first registered word data and second registered word data, a greater amount of specific words being registered in the second registered word data than in the first registered word data, and wherein, in a case of the time measured by the timing unit being morning, the extraction unit extracts the specific word in the first or second audio data based on the first registered word data in a case of the time measured by the timing unit being morning, the extraction unit extracting, in a case of the time measured by the timing unit being afternoon, the specific word included in sound based on the first or second audio data based on the second registered word data in a case of the time measured by the timing unit being afternoon.

2. The communication device according to claim 1, wherein the extraction unit stores, in the storage unit, extraction data corresponding to at least one of the specific word extracted, the phrase including the specific word, or the sentence including the specific word, and wherein the display control unit causes at least one of the specific word, the phrase including the specific word, or the sentence including the specific word to be displayed on the display unit based on the extraction data stored in the storage unit in a case of the second audio data not being inputted to the communication unit for a predetermined time and the first audio data not being outputted from the microphone for the predetermined time, or in a case of a call with an external communication device having ended.

3. The communication device according to claim 1, wherein the storage unit stores schedule book data corresponding to a schedule book, and wherein the communication device further comprises a schedule registration unit that overwrites the schedule book data stored in the storage unit to register the specific word extracted by the extraction unit in the schedule book.

4. The communication device according to claim 1, further comprising a transmission unit causing at least one of the specific word extracted by the extraction unit, the phrase including the specific word, or the sentence including the specific word to be displayed on the display unit when the time measured by the timing unit reaches the morning of a following day in a case of the specific word in the first or second audio data having been extracted based on the second registered word data.

5. A display system comprising a communication device and external equipment that connects with the communication device to be able to communicate via a communication network, wherein the communication device comprises:

a display unit that performs image display based on display data;

a microphone to which sound is inputted, the microphone converting the sound inputted into first audio data and outputting the first audio data;

a first communication unit that receives second audio data from an external communication device capable of communication; and a second communication unit that transmits the first audio data outputted from the microphone and the second audio data received by the first communication unit to the external equipment, the second communication unit receiving display data from the external equipment, and wherein the external equipment comprises:

a third communication unit that receives respective audio data from the communication device, the third communication unit transmitting display data to the communication device;

a storage unit that stores registered word data corresponding to a specific word;

an extraction unit that extracts a specific word included in the respective audio data based on the respective audio data received by the third communication unit and the registered word data stored in the storage unit;

a generation unit that generates the display data to cause at least one of the specific word extracted by the extraction unit, a phrase including the specific word, or a sentence including the specific word to be displayed on the display unit of the communication device; and a timing unit that measures time, wherein the registered word data stored in the storage unit includes first registered word data and second registered word data, a greater amount of specific words being registered in the second registered word data than in the first registered word data, and wherein, in a case of the time measured by the timing unit being morning, the extraction unit extracts the specific word in the first or second audio data based on the first registered word data in a case of the time measured by the timing unit being morning, the extraction unit extracting, in a case of the time measured by the timing unit being afternoon, the specific word included in sound based on the first or second audio data based on the second registered word data in a case of the time measured by the timing unit being afternoon.

6. The communication device according to claim 1, wherein the extraction unit extracts the specific word from the second audio data received by the communication unit based on the registered word data stored in the storage unit.

* * * * *